US012765519B2

(12) United States Patent
Renzo

(10) Patent No.: US 12,765,519 B2
(45) Date of Patent: Oct. 20, 2026

(54) CIRCULAR PLASTIC ELECTRIC PHOTO TAG

(71) Applicant: Peter Edward Renzo, Stagecoach, NV (US)

(72) Inventor: Peter Edward Renzo, Stagecoach, NV (US)

( * ) Notice: Subject to any disclaimer, the term of this patent is extended or adjusted under 35 U.S.C. 154(b) by 0 days.

(21) Appl. No.: 16/873,558

(22) Filed: Apr. 27, 2020

(65) Prior Publication Data

US 2021/0251194 A1 Aug. 19, 2021

Related U.S. Application Data

(60) Provisional application No. 62/995,853, filed on Feb. 18, 2020.

(51) Int. Cl.
*A01K 27/00* (2006.01)
*A01K 11/00* (2006.01)
*G09F 3/00* (2006.01)

(52) U.S. Cl.
CPC ............ *A01K 27/006* (2013.01); *A01K 11/00* (2013.01); *G09F 3/005* (2013.01)

(58) Field of Classification Search
CPC .... A01K 27/006; A01K 11/00; A01K 27/001; A01K 27/002; G09F 3/005
USPC .......................................................... 116/202
See application file for complete search history.

(56) References Cited

U.S. PATENT DOCUMENTS

| | | | | |
|---|---|---|---|---|
| 2,866,878 A * | 12/1958 | Christensen | H10F 30/00 | 428/690 |
| 2,885,562 A * | 5/1959 | Marinace | G01T 1/2006 | 313/499 |
| 3,130,341 A * | 4/1964 | Johnson | C09K 11/0811 | 315/9 |
| 7,318,393 B2 * | 1/2008 | Ayscue | A01K 27/006 | 119/859 |
| 7,877,909 B1 * | 2/2011 | Hagen | G09F 3/14 | 63/23 |
| 8,413,357 B1 * | 4/2013 | Hagen | G09F 3/207 | 40/303 |
| 8,516,727 B1 * | 8/2013 | Maraia | G09F 3/205 | 40/661 |
| 9,247,717 B2 * | 2/2016 | Hurwitz | A01K 27/006 | |
| 2002/0011219 A1 * | 1/2002 | Chien | A01K 27/006 | 119/859 |
| 2004/0067248 A1 * | 4/2004 | Mathias | A01K 27/007 | 424/769 |
| 2008/0018886 A1 * | 1/2008 | Wisnudel | G11B 23/286 | 356/237.1 |

(Continued)

OTHER PUBLICATIONS

GoxRunx, Reflective Bands and Tape—GoxRunx Amazon, Feb. 13, 2019, URL: <https://a.co/d/8VWpeZr>, Accessed May 7, 2025 (Year: 2019).*

*Primary Examiner* — Zoe Tam Tran
(74) *Attorney, Agent, or Firm* — Mark A. Goodman; Goodman Law Center, P.C.

(57) ABSTRACT

The Circle Light is a circular plastic tag filled with electro photo cell material that glows in total darkness. The outside circumference is a reflective tape that glows as soon as light touches the surface. It also contains a GPS electronic chip for tracking. This device can be used on any object, animal or person. To see it clearly day or night as well as determine its location.

5 Claims, 4 Drawing Sheets

(56) References Cited

U.S. PATENT DOCUMENTS

| | | | | |
|---|---|---|---|---|
| 2009/0174542 | A1* | 7/2009 | Gentry | G08B 7/066<br>362/249.02 |
| 2009/0283056 | A1* | 11/2009 | Mattera | A01K 27/006<br>119/858 |
| 2011/0126413 | A1* | 6/2011 | Szczepanowski | B26B 21/44<br>30/41 |
| 2013/0247841 | A1* | 9/2013 | Stoffels | A01K 27/006<br>119/858 |
| 2014/0116354 | A1* | 5/2014 | Harris, II | A47D 13/086<br>119/796 |
| 2016/0255817 | A1* | 9/2016 | Renforth | A01K 27/006 |
| 2020/0250503 | A1* | 8/2020 | Wang | G06K 19/07 |
| 2023/0048900 | A1* | 2/2023 | Vardi | A01N 25/10 |

* cited by examiner

CIRCULAR PLASTIC ELECTRIC PHOTO TAG

Figure 1:
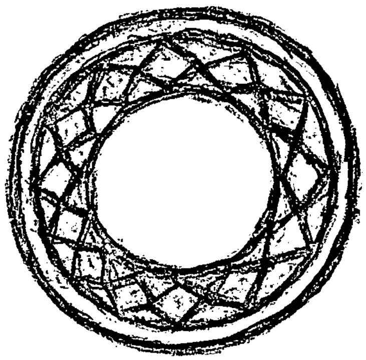
Figure 2:
Figure 3:
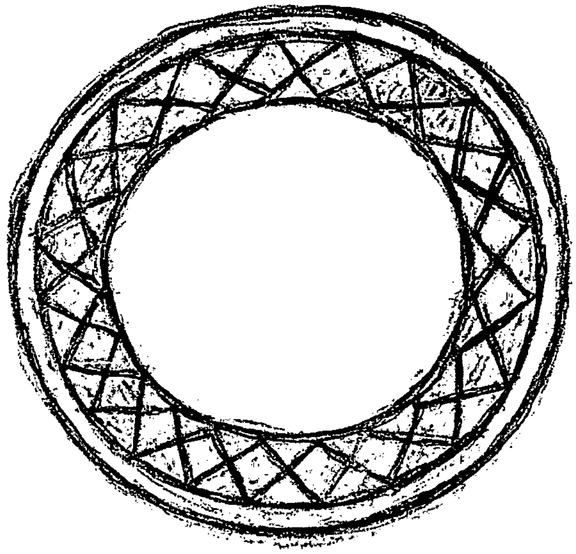
Figure 4:

Description FIG. 1. Front view of Circle light ID tag
1 11116" diameter
$1\frac{3}{16}$"
inside
diameter
$\frac{1}{8}$"
thickness
$\frac{1}{4}$" reflective
tape set in $\frac{1}{16}$"
from outer edge
Description FIG. 2. Side view of Circle Light ID tag
$1\frac{11}{16}$" diameter
$\frac{1}{8}$" thickness
Description FIG. 3. Front view of Circle Light ID tag
$2\frac{11}{16}$" diameter
$2\frac{3}{16}$"
inside
diameter
$\frac{1}{8}$"
thickness
$\frac{1}{4}$" reflective
tape set in $\frac{1}{16}$"
from outer edge
Description FIG. 4. Side view of Circle Light ID tag
$2\frac{11}{16}$'diameter
$\frac{1}{8}$" thickness

DETAILED DESCRIPTION

The circle Light is a glow in the dark and a reflect in the light pet ID tag.

It is an electric photo cell plastic tag made in a circle. The outside portion is a reflective tape that glows as soon as light touches the surface. The inside glows in total darkness.

It's composition of matter is a circular hard plastic tag injection molded with electro photocell material whose cells become electrically charged when any light touches its surface. The outside circumference is a special highly glossy aluminum reflective tape which is cut to fit precisely on its inner edge.

This invention is used to clearly see and identify any pet animal or person in total darkness or if light touches the outer circumference of the tag it will reflect immediately back to the person or object sending the light.

This tag is a major breakthrough of improvement from regular previously metal ID pet tags which cannot glow in the dark or reflect in the light, but only identify the animal by written description on its metal surface. Also, the circular design has smooth edges so there is no chance of getting cut as there is with a metal tag.

It is also a major breakthrough as the center of the tag which can be engraved can be read in total darkness because of the electro photo cell material it contains, a metal tag cannot do this.

The invention claimed is:

1. An electric photo cell tag device comprising:

a) a circular shaped body including a first side;

b) the first side includes an outer surface area and an inner surface area;

c) the outer surface area includes a reflective tape;

d) the reflective tape is configured to reflect light received from a light source;

e) the inner surface area includes electric photo cell material;

f) the electric photo cell material is configured to receive energy from a light source and store an electrical charge; and g) the electric photo cell material is configured to glow in the dark.

2. The device of claim 1, wherein the electric photo cell material is configured to recharge to full capacity after receiving energy from a second light source.

3. The device of claim 1, further comprising:

a) the circular shaped body includes a second side;

b) the second side includes an outer surface area and an inner surface area;

c) the outer surface area of the second side includes a reflective tape;

d) the reflective tape is configured to reflect light received from a light source;

e) the inner surface area of the second side includes electric photo cell material;

f) the electric photo cell material is configured to receive energy from a light source and store an electrical charge; and g) the electric photo cell material is configured to glow in the dark.

4. The device of claim 3, wherein the electric photo cell material is configured to recharge to full capacity after receiving energy from a second light source.

5. The device of claim 3, wherein the reflective tape of the first side comprises aluminum, and the reflective tape of the second side comprises aluminum.

* * * * *